US006155506A

United States Patent [19]
Loppoli

[11] Patent Number: 6,155,506
[45] Date of Patent: Dec. 5, 2000

[54] CUTTER-MIXER AND BED-STRAW SPREADER WAGON PROVIDED OF A PERFECTED GROUP FOR THE DISTRIBUTION OF THE STRAW OUTSIDE THE WAGON

[75] Inventor: Giuseppe Loppoli, Grantorto, Italy

[73] Assignee: SEKO SpA, Curtarolo, Italy

[21] Appl. No.: 09/297,719

[22] PCT Filed: Nov. 7, 1997

[86] PCT No.: PCT/EP97/06188

§ 371 Date: May 7, 1999

§ 102(e) Date: May 7, 1999

[87] PCT Pub. No.: WO98/20728

PCT Pub. Date: May 22, 1998

[30] Foreign Application Priority Data

Nov. 8, 1996 [IT] Italy ................................. VI96A0183

[51] Int. Cl.[7] .................................................. B02C 13/08
[52] U.S. Cl. .................................. 241/186.3; 241/101.76; 241/186.5; 241/605
[58] Field of Search ........................ 241/605, 101.76, 241/186.5, 186.3

[56] References Cited

U.S. PATENT DOCUMENTS

| 3,802,208 | 4/1974 | Granholm et al. ........................ 61/63 |
|---|---|---|
| 4,017,034 | 4/1977 | Griffith et al. ............................ 241/74 |
| 4,192,088 | 3/1980 | Saalasti ......................................... 37/3 |
| 4,292,795 | 10/1981 | Linn ........................................... 56/503 |
| 4,410,142 | 10/1983 | Carlson ..................................... 241/18 |
| 4,616,785 | 10/1986 | Artiano ..................................... 241/26 |
| 4,637,406 | 1/1987 | Guinn et al. .......................... 130/27 R |
| 4,778,276 | 10/1988 | Meyer et al. ............................... 366/2 |
| 4,832,538 | 5/1989 | Bullerman et al. ....................... 406/98 |
| 5,186,539 | 2/1993 | Manser et al. ............................ 366/85 |
| 5,794,423 | 8/1998 | McLeod ................................. 56/14.6 |
| 5,833,533 | 11/1998 | Roberg .................................... 460/112 |

FOREIGN PATENT DOCUMENTS

| 0 404 028 | 12/1990 | European Pat. Off. . |
| 0 494 812 | 7/1992 | European Pat. Off. . |
| 0 793 911 | 9/1997 | European Pat. Off. . |

*Primary Examiner*—Joseph J. Hail, III
*Assistant Examiner*—William Hong
*Attorney, Agent, or Firm*—Dykema Gossett PLLC

[57] ABSTRACT

A cutter-mixer and bed-straw spreader wagon for fibrous products having a container with rotating screw feeder inside and outwardly of a distribution group for conveying the cut and mixed material outside the container. The distribution group has a fan with a volute that is fixed to a side of a wagon and has an internal impeller with at least four blades having planar surfaces.

12 Claims, 6 Drawing Sheets

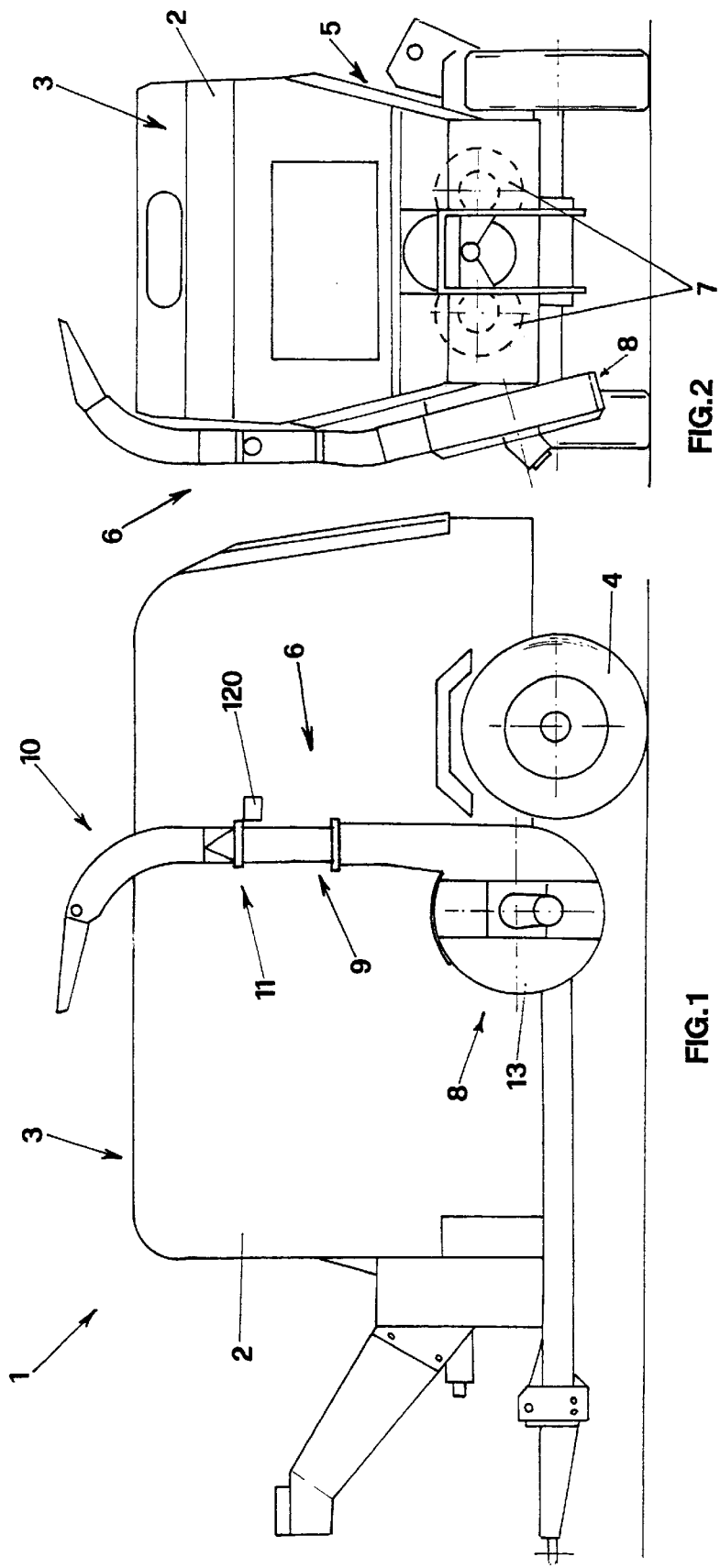

CUTTER-MIXER AND BED-STRAW SPREADER WAGON PROVIDED OF A PERFECTED GROUP FOR THE DISTRIBUTION OF THE STRAW OUTSIDE THE WAGON

BACKGROUND OF THE INVENTION

The invention concerns a cutter-mixer and bed-straw spreader wagon for cutting and mixing fibrous products such as fodder grass or straw silages for the distribution of the straw outside the wagon for making litters.

It is known that special cutter-mixer wagons which have a distribution group for tossing the straw outside the wagon are used to make litters.

In particular, the cutter-mixer and bed-straw spreader wagon which is object of the Italian Patent No. V194A000047 by the same inventor of the present patent, is able to cut and mix every product for a zootechnical use and is also used for the distribution of the straw outside the wagon for realizing litters is known.

The distribution group of the car is substantially formed of a duct which by a fan, conveys the cut straw from the screw feeders of the wagon to an adjustable delivery opening, and is connected to the end of the conduit which directs the throwing of the straw towards the zones where the litters will be realized.

In particular, the fan causes the volute to be applied laterally on one side of the wagon. Inside is arranged an impeller having blades with a curved outline that are started by a hydraulic engine. Therefore it is substantially a centrifugal fan of the known kind.

One drawback of the distribution group, is that the throwing distance which this distribution group realizes is rather limited.

The present invention intends to overcome such a limitation by having a cutter-mixer and bed-straw spreader wagon distribution group for the straw that can throw distances much greater than the cutter-mixer and bed-straw spreader wagons of the known kind.

BRIEF SUMMARY OF THE INVENTION

It is an object of the present invention that the distribution group for the straw have a delivery opening, adjustable by a rotation group started by an electrical engine. The objectives are achieved with the cutter-mixer and bedstraw spreader wagon for fibrous products that is comprised of a container having at least one inlet opening for the introduction of the material to treat; at least one rotating screw feeder arranged on the bottom of the container, having at least one couple of spirals with an opposite winding direction in order to convey the treated material in an intermediate zone of the screw feeder; at least one distribution group for conveying the treated material outside the container and comprising a delivery conduct having an end connected to a fan which sucks up the material inside the container, and the opposite end supplied of the delivery opening for directing the treated material outside the jet and the fan comprises a volute that is fixed to a side of the wagon and communicating with the inside of the wagon itself by a suction opening which is arranged in correspondence with an intermediate zone of the screw feeder. Inside the volute is an impeller formed of a circular disk keyed to motorization means suitable for starting it and having a plurality of blades, each of which presents at least a plane surface having an outline that is radially diverted towards the volute beginning from the central zone of the circular disk which is keyed to the motorization means.

According to a preferred embodiment, the impeller has four orthogonal blades and a delivery opening is connected to a delivery duct by a rotation junction that can put it into rotation so to convey the used material straw in the desired direction.

The fan allows some cut and mixed straw to be thrown out to greater distances than those known in the art.

The turning delivery opening is fixed in an end position relative to the delivery opening, it is of a contained length and lighter. It can be put in rotation by kinematic mechanisms coupled to the rotating joint which are actioned by an electric engine of low power without the help of heavy and expensive hydraulic actuators.

BRIEF DESCRIPTION OF THE SEVERAL VIEWS OF THE DRAWINGS

The purposes and the advantages will be better understood with regard to the description of a preferred embodiment, appended claims, and accompanying drawings where:

FIG. 1 shows the wagon of the invention in side view;

FIG. 2 shows the wagon of FIG. 1 in frontal view;

DETAILED DESCRIPTION OF THE INVENTION

Figure 3:
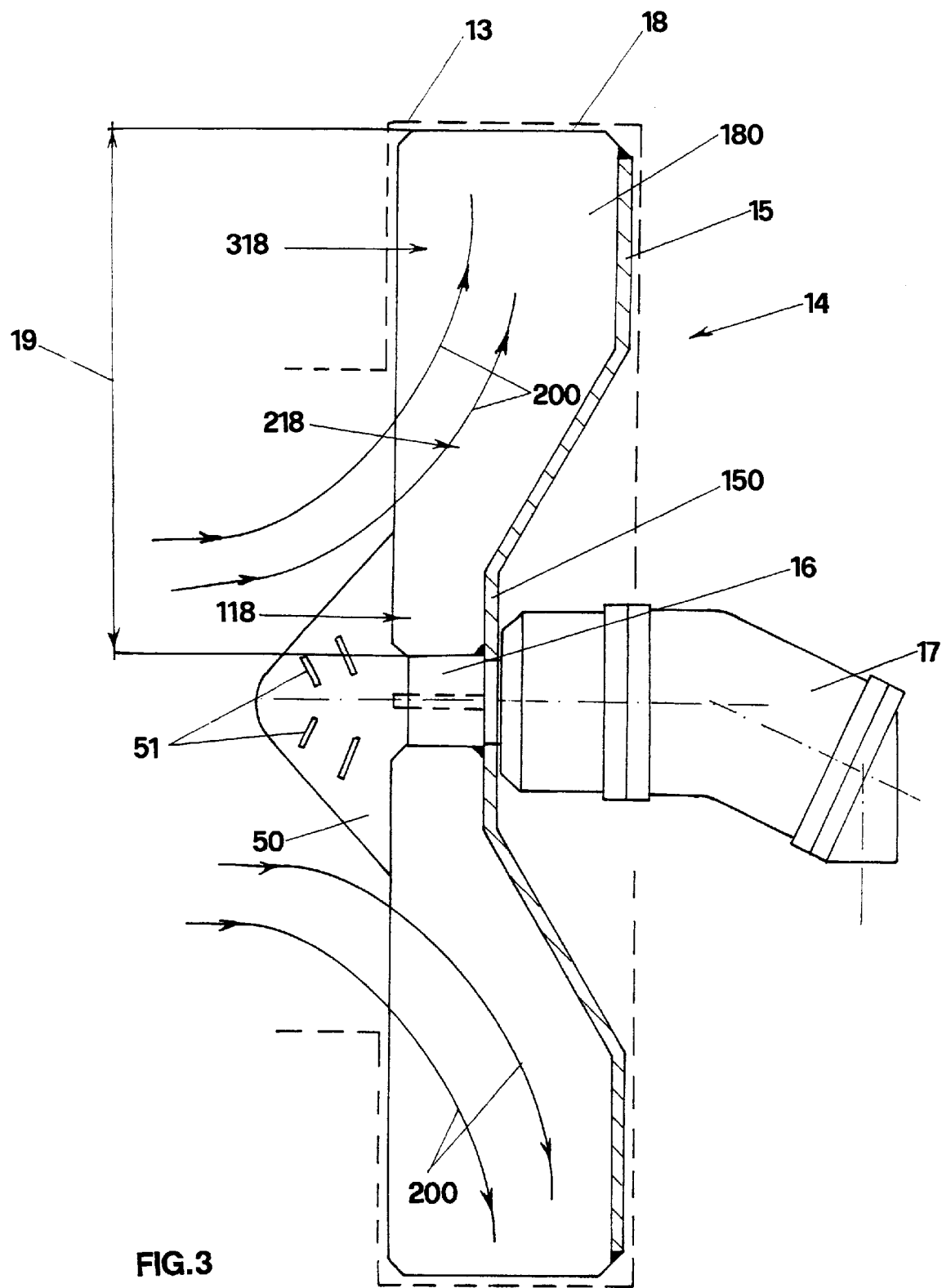
FIG. 3 shows schematically and according a radial plane, the impeller detail and the detail of the motorization of the fan which equips the wagon of the invention.

As it can be observed in FIGS. 1 and 2, the wagon of the invention, on the whole pointed out with 1, comprises a container 2, having wheels 4 and a charging opening 3 for the material to be treated.

The container 2 has a sheet and a couple of screw feeders 7 for the cutting and the mixing of the material inside.

On the side of the wagon and in correspondence of the side walls of the container 2, is a side door 5, through which the cut and mixed product is unloaded outside. A distribution group, on the whole pointed out with 6, is for conveying to the outside, the material that is treated inside the container 2 itself. The distribution group is arranged on the opposite part of the wagon.

Figure 4:
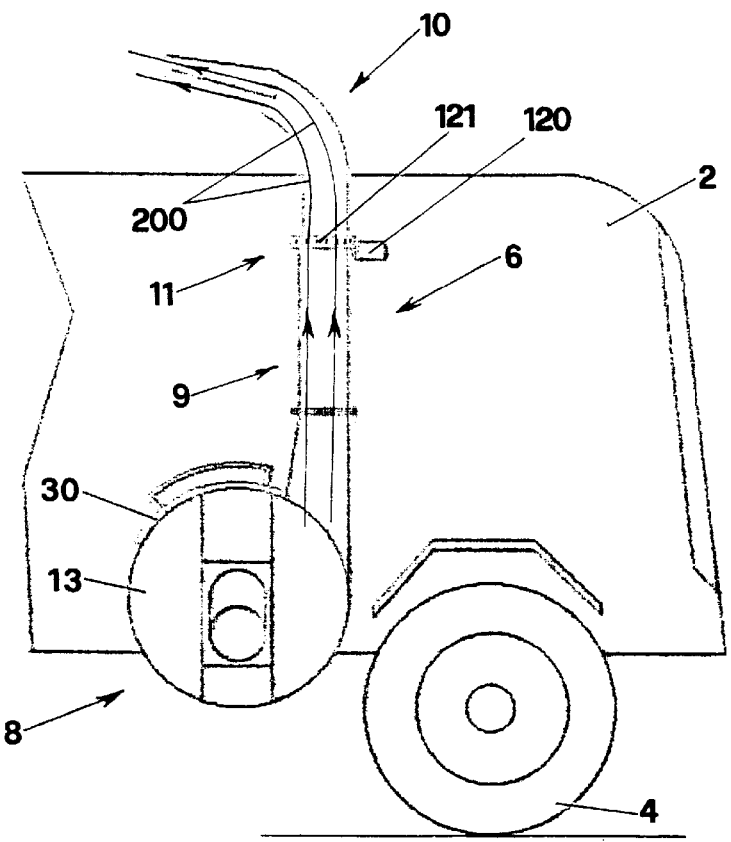
FIG. 4 shows an outside frontal view the of distribution group which equips the wagon of the invention.
Figure 5:
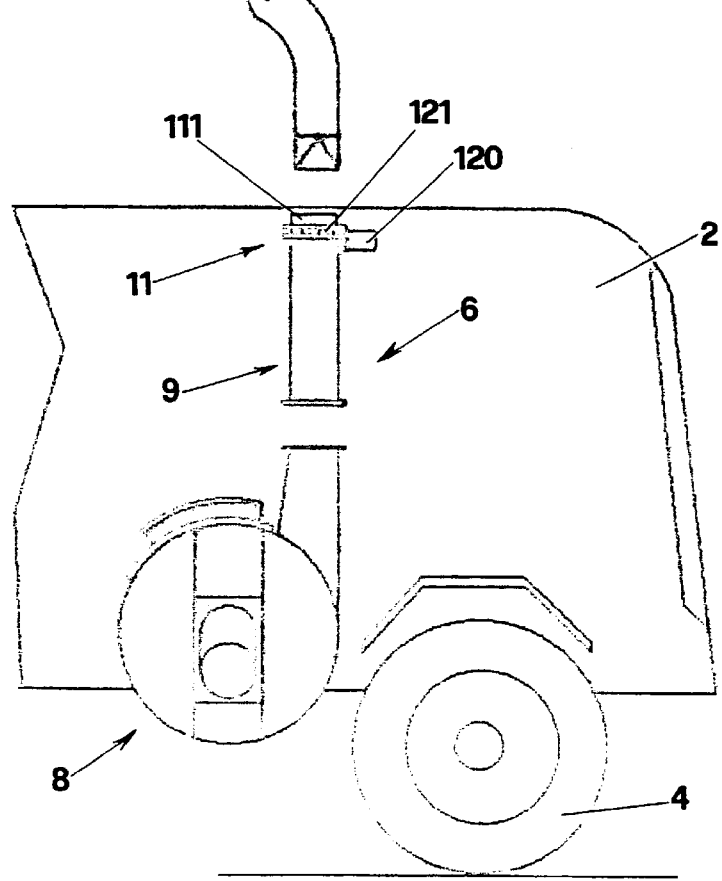
FIG. 5 shows the distribution group of FIG. 4 represented in an exploited view.

As shown in the FIGS. 4 and 5, the distribution group 6 is comprised of a fan 8 fixed to a side wall of the container 2, arranged in an inclined and opposite position to said door 5; a delivery duct 9 of the treated material, which is taken from the inside of the container 2 by the fan 8 and sent outside; a delivery opening 10 arranged at one end of the delivery duct 9, for sending the material in a desired direction; and a rotation group 11 for rotatingly connecting the delivery opening 10 to the delivery duct 9.

Fan 8, which is visible also in detail in FIGS. 3, 8, 9 and 10, is be formed of a volute 13 which is fixed to the wall of the container 2. Inside the volute 13 is an impeller 14 having a disk 15 having a central zone 150 fixed to motorization means formed of an hydraulic engine 17 suitable for starting it and is supplied of four radial blades 18 arranged orthogonally among them.

Figure 9:
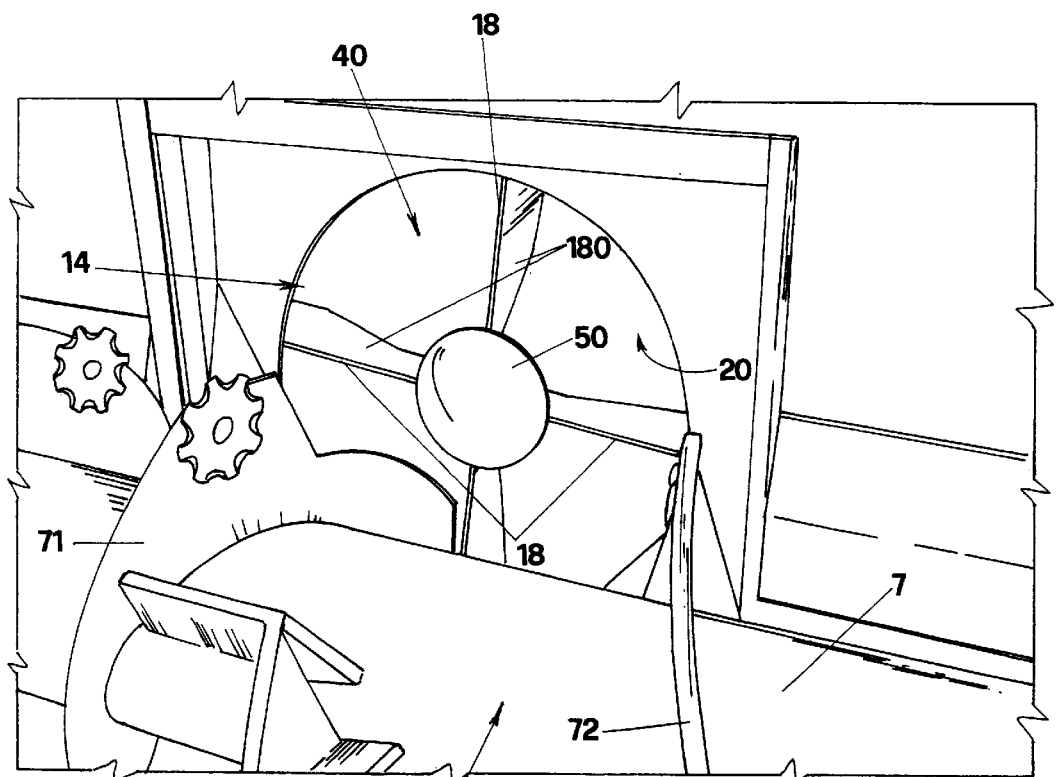
FIG. 9 shows the suction opening and intermediate zone of the screw feeder.

In FIG. 9, each blade 18 is formed of a metallic sheet with a constant thickness with a plane surface 180 having an outline 19 diverging towards the volute 13 beginning from the central zone 150 of the disk 15 where the hydraulic engine 17 is keyed. In particular, it can be observed that the outline 19 of each blade 18 is shaped in order that the central zone 118 of the blade 18 fixed to the shaft 16 of the engine 17 has a shape substantially rectangular and is connected to an intermediate zone 218 having a substantially trapezoidal form whose smaller base is connected to the central zone 118 and whose greater base is connected to the terminal zone 318 of the blade 118 itself, and like the central zone 118 has a substantially rectangular form.

According to different executive forms, each of the blades 18 could even have a different outline from that one described, though radially divergent towards the volute 13 beginning from the shaft 16 of the engine 17.

Further in another executive variant, the number of the blades 18 which form the impeller 14 could be different from four and the blades could be placed at different angles.

Figure 6:
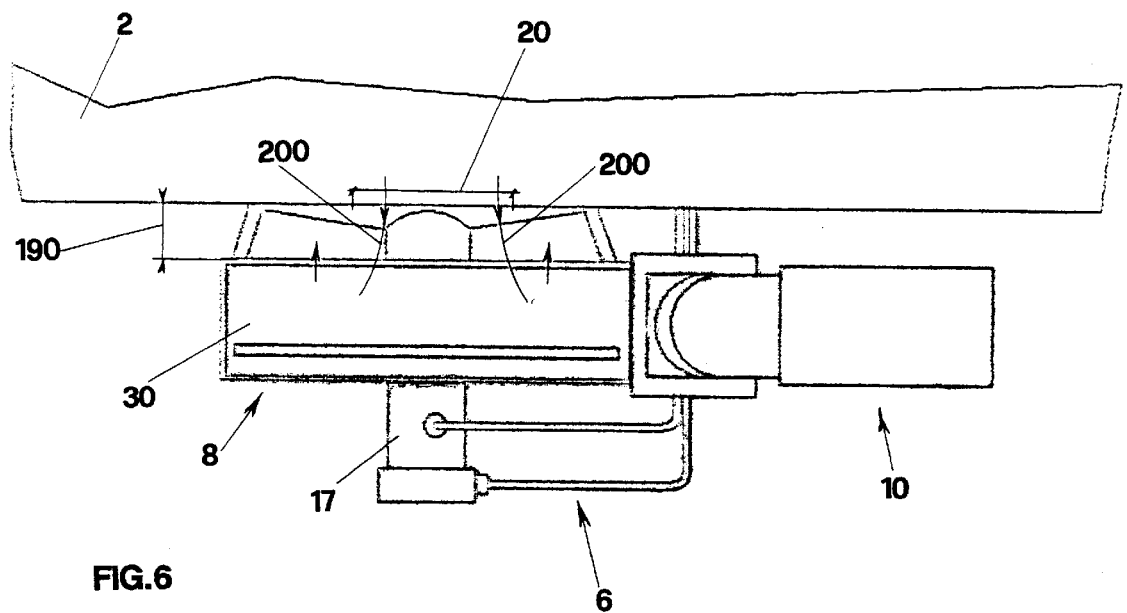
FIG. 6 shows the distribution group of FIG. 4, represented in an upper view and with the regulation shutter of the intaken air completely opened.
Figure 7:
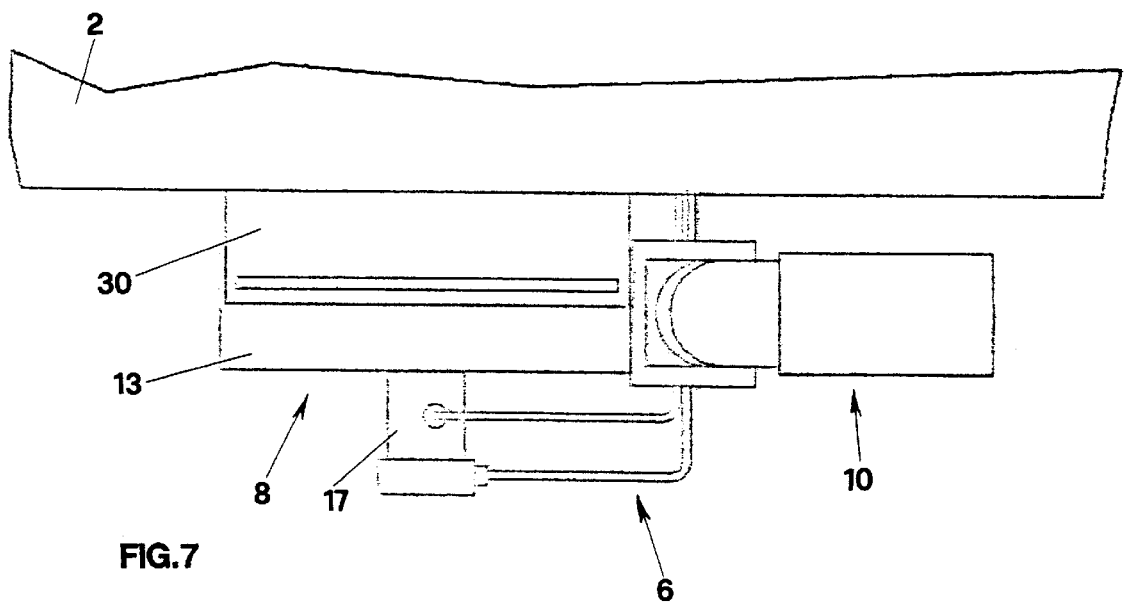
FIG. 7 shows the distribution group of FIG. 4 represented in upper view and with the regulation shutter of the air located in close position.
Figure 8:
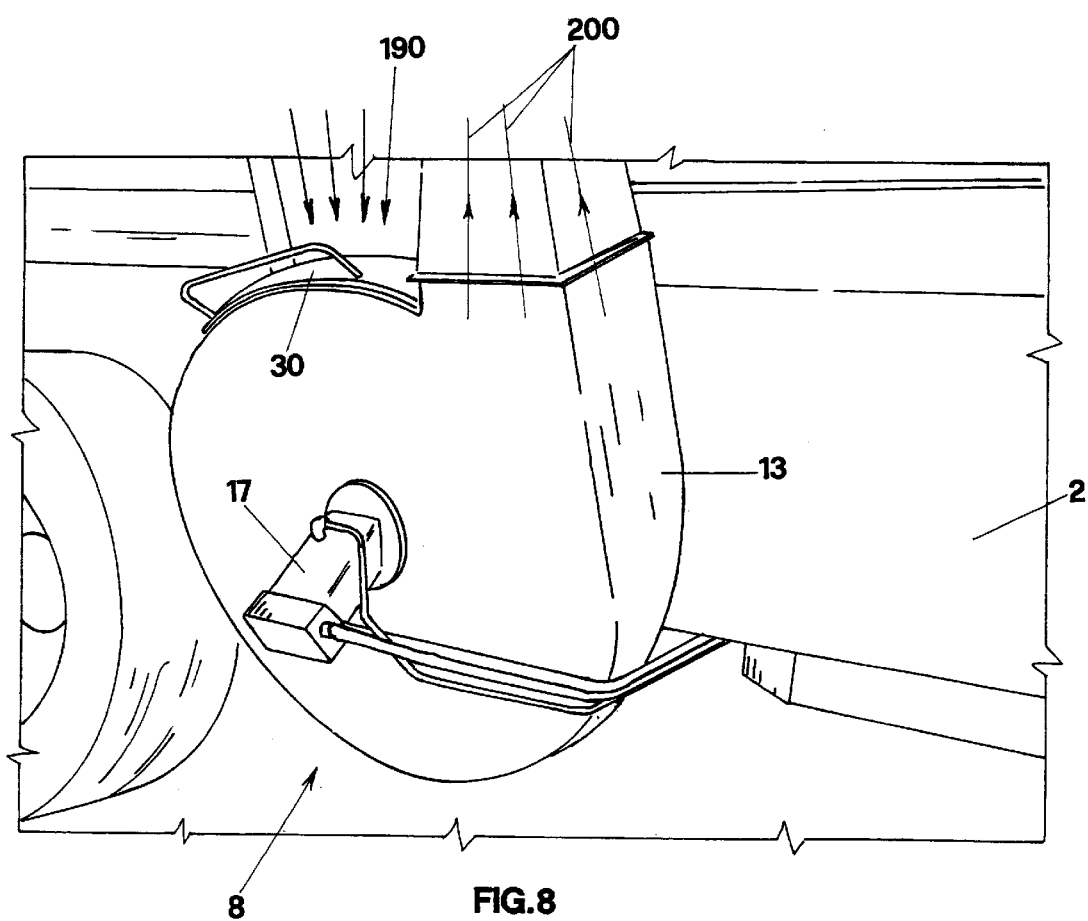
FIG. 8 shows in axionometric representation and outwardly the fan detail which equips the distribution group of the wagon of the invention, in an inner view of the wagon itself and from the impeller side.

It can be observed in FIGS. 6 and 7 that the volute 13 of the fan 8 is fixed to the wall of the wagon in order to define a clear span 190 through which the outside air can be sucked up by the inlet opening 20. The volute 13 which, as shown in FIG. 9, communicates with the inside of the wagon in the opposite part of the discharge door 5, in correspondence of the intermediate zone 21 of each of the screw feeders 7, in which the spirals 71 and 72 are formed.

At the volute 13 of the fan 8, is fixed the delivery duct 9. A rotation group 11 having a rotating joint 111 which is put in rotation by an electric engine 120 by a chain 121 which is connected to the duct 9. A delivery opening 10 is connected to the rotation joint 111. When the screw feeders 7 and the impeller 14 of the fan 8 are put in rotation by the hydraulic system 17, the throwing speed and capacity of the cut and mixed product are regulated by changing the position of a suitable shutter 30 visible in the FIGS. 6 and 7. The shutter 30 is slidingly connected to the volute 13, which chokes the span 190 through which the suction opening 20 of the fan sucks up air from the outside.

The regulation of the air which is sucked up is extremely important because it is such a flow which allows the device to convey the cut material outside, according to the well known principles which rule the transport processes of the materials by aerial gas.

Figure 10:
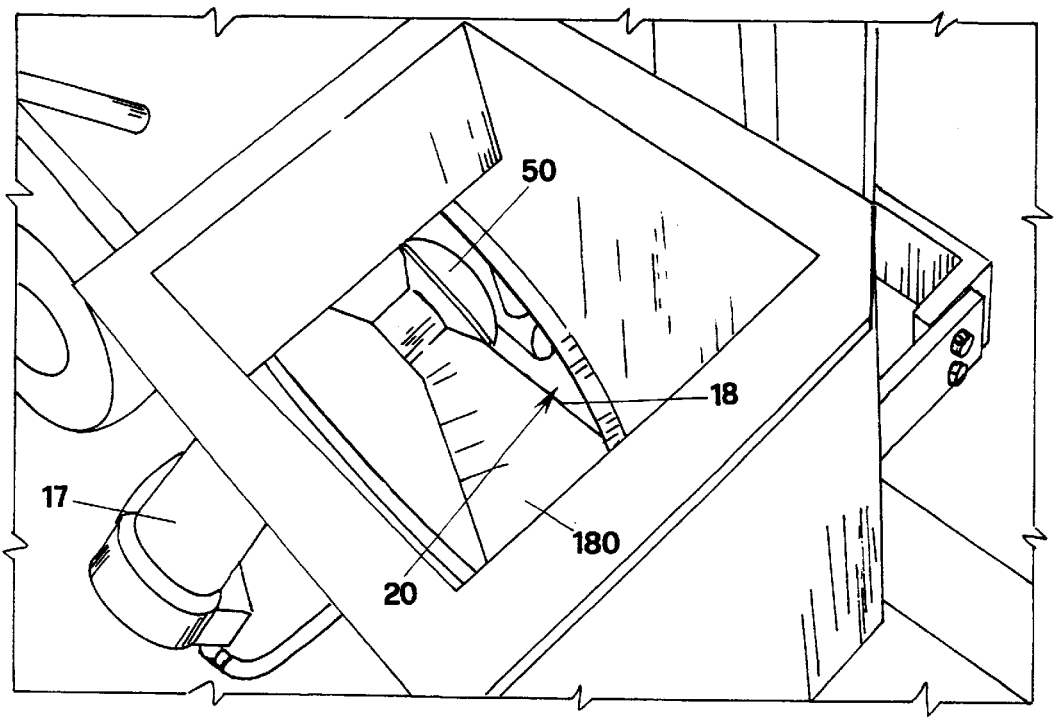
FIG. 10 shows part of the impeller of the fan which equips the distribution group belonging to the wagon of the invention, in axionometric view and seen through the delivery opening realized in the volute of the fan.

In FIG. 9 and in FIG. 10, the diverging conformation towards the volute 13 of each blade 18 and of the reciprocal disposition of the blades is shown. The disposition of the blades define the diverging ducts 40 to the surface 180 of the blades 18 which come in contact with the material and are planar in shape. The planar shape contributes to the elevated exit speed of the material from the delivery opening 10 which allows the device to reach throwing distances much superior compared to those reachable using distribution groups of the known kind where centrifugal fans having curved blades are used.

It can be observed in FIG. 3 and in FIG. 9, that in order to help convey the material through the suction opening of the volute 13, the central area 118 of the blades 18 is provided with an ogive 50 for conveying the flow 200 of the material. Eventually, in order to improve the winding up of the flow of the entering material, the ogive 50 can be provided of cutters 51.

The cutter-mixer wagon of the invention has all the characteristics of a normal cutter-mixer wagon and can be used even to execute only the cutting and the mixing of silages and other zootechnical products which can be discharged according to the normal technique of use through the side door 5.

Further it has been seen that the delivery opening 10 which is connected to the upper part of the delivery duct 9 has a length quite reduced and therefore a limited weight. The delivery opening 10 can be rotated using an electric engine 120 rather than hydraulic actuators as it happens in the applications of the known type. As previously described, the wagon of the invention, supplied with the perfected distribution group, achieves all the desired purposes and objectives.

Some modifications can be made to the shape, the number and the dimension of the blades that form the impeller of the fan as well as other modifications to the wagon of the invention and particularly to the distribution group that equips it.

The rotation devices of the impeller itself can also be changed. Other variants can be, for example, different shapes of the delivery opening or different outward configurations of the volute of the fan and of the delivery duct or other different structures of the choking grid of the intaken air.

A variant not discussed but contemplated is that the wagon of the invention is not supplied with the discharge side door, so that it can be used only for executing the bed-straw spreader operations with previously cut and mixed straw inside the wagon by the action of the screw feeders.

All said variants and others are all protected by the present invention.

What is claimed is:

1. A cutter-mixer and bed-straw spreader wagon for treating fibrous material comprising:

a container having at least one opening for the introduction of the material;

at least one rotating screw feeder arranged in the bottom of said container, including at least one pair of spirals with an opposite winding direction in order to convey the material towards an intermediate zone thereof;

at least one distribution means for conveying the material outside said container comprising a delivery conduit having a first end and a second end;

a fan connected to the first end of the conduit for drawing up the material from inside said container, and the second end for directing the material outside the container, said fan comprising a volute fixed to said wagon and communicating with the interior thereof by a suction opening located in correspondence with said intermediate zone, a motorized impeller formed of a circular disk including a plurality of blades, each of which includes at least one plane surface having an outline which radially diverts towards said volute beginning from a central zone of said circular disk;

said impeller has a central region and includes an ogive fixed to the blades in the central region, said ogive for conveying a flow of material through said suction opening of said volute of said fan; and said ogive has an outward periphery and includes a plurality of cutters on the outer periphery for winding said flow of material entering in said volute of said fan.

2. A cutter-mixer and bed-straw spreader wagon for treating fibrous material comprising:

a container having at least one opening for the introduction of the material;

at least one rotating screw feeder arranged in the bottom of said container, including at least one pair of spirals with an opposite winding direction in order to convey the material towards an intermediate zone thereof;

at least one distribution means for conveying the material outside said container comprising a delivery conduit having a first end and a second end;

a fan connected to the first end of the conduit for drawing up the material from inside said container, and the second end for directing the material outside the container, said fan comprising a volute fixed to said wagon and communicating with the interior thereof by a suction opening located in correspondence with said intermediate zone, a motorized impeller formed of a circular disk including a plurality of blades, each of which includes at least one plane surface having an outline which radially diverts towards said volute beginning from a central zone of said circular disk; and said volute is fixed spaced out from the wall of the container for defining air flow to said suction opening of the volute, and a shutter slidingly connected to said volute.

3. A cutter-mixer and bed-straw spreader wagon for treating fibrous material comprising:

a container having at least one opening for the introduction of the material;

at least one rotating screw feeder arranged in the bottom of said container, including at least one pair of spirals with an opposite winding direction in order to convey the material towards an intermediate zone thereof;

at least one distribution means for conveying the material outside said container comprising a delivery conduit having a first end and a second end;

a fan connected to the first end of the conduit for drawing up the material from inside said container, and the second end for directing the material outside the container, said fan comprising a volute fixed to said wagon and communicating with the interior thereof by a suction opening located in correspondence with said intermediate zone, a motorized impeller formed of a circular disk including a plurality of blades, each of which includes at least one plane surface having an outline which radially diverts towards said volute beginning from a central zone of said circular disk, and wherein each of said blades comprises a radially extending plane sheet including a central zone of a substantially rectangular shape;

a terminal zone having a substantially rectangular shape located next to said volute; and an intermediate zone having a substantially trapezoidal shape with a smaller base connected to said central zone and a greater base connected to said terminal zone.

4. A cutter-mixer and bed-straw spreader wagon according to claim 3, further comprising a rotating joint which connects said delivery conduit to said delivery opening.

5. A cutter-mixer and bed-straw spreader wagon according to claim 4, further comprising an engine coupled to the joint.

6. A cutter-mixer and bed-straw spreader wagon according to claim 5, wherein the engine comprises an electric motor.

7. A cutter-mixer and bed-straw spreader wagon according to claim 3, wherein said impeller has a central region and includes an ogive fixed to the blades in the central region, said ogive for conveying a flow of material through said suction opening of said volute of said fan.

8. A cutter-mixer and bed-straw spreader wagon according to claim 3, further comprising motorization means for driving said impeller.

9. A cutter-mixer and bed-straw spreader wagon according to claim 8, wherein the motorization means comprises a hydraulic motor.

10. A cutter-mixer and bed-straw spreader wagon according to claim 3, wherein said blades comprise four outwardly extending members paired in orthogonal groups.

11. A cutter-mixer and bed-straw spreader wagon according to claim 3, further comprising a motor for driving the circular disk.

12. A cutter-mixer and bed-straw spreader wagon according to claim 11, wherein the circular disk is keyed to the motor.

* * * * *